(12) United States Patent
Hosoe et al.

(10) Patent No.: US 9,151,390 B2
(45) Date of Patent: Oct. 6, 2015

(54) SLIDING PARTS

(75) Inventors: Takeshi Hosoe, Tokyo (JP); Hideyuki Inoue, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/240,625

(22) PCT Filed: Aug. 13, 2012

(86) PCT No.: PCT/JP2012/070645
§ 371 (c)(1),
(2), (4) Date: Feb. 24, 2014

(87) PCT Pub. No.: WO2013/035502
PCT Pub. Date: Mar. 14, 2013

(65) Prior Publication Data
US 2014/0197600 A1 Jul. 17, 2014

(30) Foreign Application Priority Data

Sep. 10, 2011 (JP) .................................. 2011-197731

(51) Int. Cl.
*F16J 15/40* (2006.01)
*F16J 15/34* (2006.01)

(52) U.S. Cl.
CPC ................ *F16J 15/40* (2013.01); *F16J 15/342* (2013.01); *F16J 15/3408* (2013.01); *F16J 15/3412* (2013.01)

(58) Field of Classification Search
CPC ..... F16J 15/34; F16J 15/3404; F16J 15/3408; F16J 15/3412
USPC ................................................. 277/399, 400
See application file for complete search history.

(56) References Cited

U.S. PATENT DOCUMENTS 5,066,026 A * 11/1991 Heck et al. ..................... 277/400
5,201,531 A * 4/1993 Lai ................................. 277/400
(Continued)

FOREIGN PATENT DOCUMENTS

JP H04-000073 A 1/1992
JP H07-260009 A 10/1995
(Continued)

OTHER PUBLICATIONS

Notification of Transmittal of Translation of the International Preliminary Report on Patentability (PCT/IB/338) mailed Mar. 20, 2014, with International Preliminary Report on Patentability (PCT/IB/373) and Written Opinion of the International Searching Authority (PCT/ISA/237), for corresponding international application PCT/JP2012/070645.
(Continued)

*Primary Examiner* — Gilbert Lee
(74) *Attorney, Agent, or Firm* — Law Office of Katsuhiro Arai

(57) ABSTRACT

Sliding parts are provided wherein a plurality of pumping areas for generating pumping action via the relative rotational sliding of a stationary ring and a rotating ring is discontinuously formed in a circumferential direction on a sealing face of one of the stationary ring and rotating ring so as to communicate with a sealed fluid-containing space. The pumping areas are provided with intake pumping areas operating in a direction in which the sealed fluid is drawn in and outflow pumping areas operating in a direction in which the sealed fluid is expelled. A plurality of dynamic pressure-generating grooves for generating dynamic pressure via the relative rotational sliding of the stationary ring and the rotating ring are formed in a circumferential direction on a sealing face of the other of the stationary ring and the rotating ring so as to communicate with the sealed fluid-containing space.

18 Claims, 11 Drawing Sheets

(a)

(b)

(56) References Cited

U.S. PATENT DOCUMENTS

| | | | |
|---|---|---|---|
| 5,529,318 | A | 6/1996 | Fuse et al. |
| 5,664,787 | A | 9/1997 | Fuse et al. |
| 6,454,268 | B1 * | 9/2002 | Muraki ............ 277/361 |
| 7,258,346 | B2 * | 8/2007 | Tejima ............ 277/399 |
| 7,891,670 | B2 * | 2/2011 | Alajbegovic ............ 277/559 |
| 7,931,277 | B2 * | 4/2011 | Garrison ............ 277/399 |
| 2002/0109302 | A1 | 8/2002 | Muraki |
| 2011/0101616 | A1 | 5/2011 | Teshima et al. |

FOREIGN PATENT DOCUMENTS

| | | | |
|---|---|---|---|
| JP | 08159295 | A | 6/1996 |
| JP | H08-303606 | A | 11/1996 |
| JP | 2002-235858 | A | 8/2002 |
| JP | 2009014138 | A | 1/2009 |
| JP | 2009250378 | A | 10/2009 |
| WO | 2009/087995 | A1 | 7/2009 |

OTHER PUBLICATIONS

International Search Report (ISR), mailed Sep. 25, 2012, issued for International Application No. PCT/JP2012/070645.

A Notification of Reasons for Refusal issued by the State Intellectual Property Office of China, mailed Mar. 27, 2015, with a search report (Mar. 19, 2015) for Chinese counterpart application No. 201280040600.X.

* cited by examiner

Fig. 10
Background Art
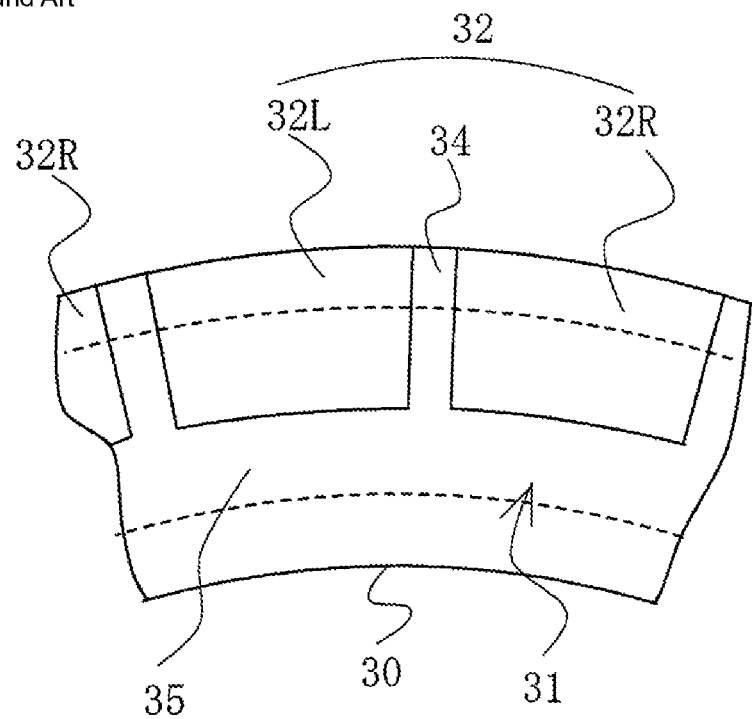
(a)
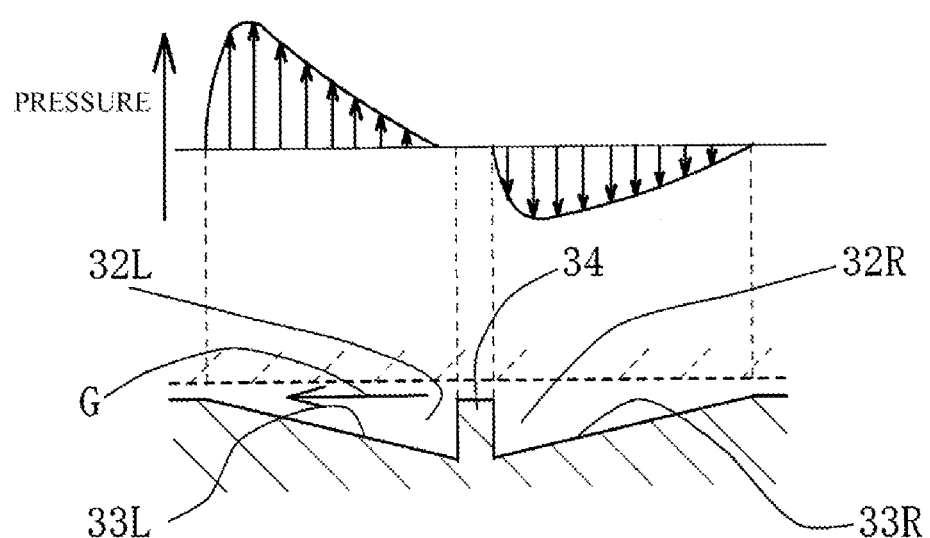
(b)

SLIDING PARTS

This application is the U.S. National Phase under 35 U.S.C. §371 of International Application PCT/JP2012/070645, filed Aug. 13, 2012, which claims priority to Japanese Patent Application No. 2011-197731, filed Sep. 10, 2011. The International Application was published under PCT Article 21(2) in a language other than English.

TECHNICAL FIELD

The present invention relates to relatively rotating sliding parts, and in particular to sliding parts used, for example, in the field of automotive seals, general industrial mechanical seals, and other types of mechanical seals.

BACKGROUND ART

In sealing apparatuses for preventing the leakage of a sealed fluid, such apparatuses comprising two parts configured so as to rotate relatively to one another and so that end surfaces thereof slide along a plane, such as, for example, a mechanical seal, a balance must be struck between the two opposing conditions of seal tightness and lubrication in order to maintain seal integrity for extended periods of time. In recent years, environmental concerns in particular have led to an increase in demand for reduced friction in order to reduce mechanical damage while preventing sealed fluid leakage. Methods of reducing friction include the so-called fluid lubrication state, in which dynamic pressure is generated between sealing faces due to rotation, and the surfaces slide with a liquid film interposed therebetween. However, in such cases, positive pressure is generated between the sealing faces, so that the fluid escapes from the positive pressure portion outside of the sealing faces. Such fluid outflow constitutes leakage in the case of a seal.

Mechanical seals such as that shown in FIG. 10, in which dynamic pressure is generated between sealing faces via rotation, are known in the art ("first prior art"; see, for example, patent document 1). In the first prior art shown in FIG. 10, a plurality of radial direction grooves 32R, 32L for generating dynamic pressure during rotation is provided in the circumferential direction of a sealing face 31 of a mating ring 30 constituting one of a pair of sliding parts, with tapering surfaces 33R, 33L tapering in opposite directions being formed following the circumferential direction so that the boundary between one pair of radial direction grooves 32R, 32L is in a trough formed by the tapering surfaces, and a dam part 34 being formed at the boundary so as to separate the radial direction grooves 32R, 32L.

As shown in FIG. 10(b), when the sliding parts rotate relative to each another, the pressure in the radial direction groove 32R, which lies in the upstream direction of a gas flow G, decreases, creating negative buoyancy, and the wedge effect of the tapering surface 33L in the radial direction groove 32L on the downstream side of the dam part 34 increases pressure, creating positive buoyancy. At this time, the action of the dam part 34 decreases the negative pressure and increases the positive pressure, creating a net positive pressure and allowing a strong buoyancy to be obtained.

Meanwhile, the inventors have already filed a patent application for sliding members for a mechanical seal for sealing a sealed fluid present on one side in the radial direction of relatively rotationally sealing faces, wherein a plurality of grating portions 50, in which a plurality of parallel rectilinear indentations are formed at a predetermined pitch within a predetermined area, is discontinuously formed in a circumferential direction in an area between radii R2 and R3 on a sealing face 51 having an internal diameter R1 and an external diameter R4; the rectilinear indentations of the plurality of grating portions being formed so that the direction thereof inclines at a predetermined angle relative to the sliding direction of the sealing face, thereby improving the introduction and retention of the sealed fluid between the sealing faces, and allowing stable and favorable lubrication to be obtained, as shown in FIG. 11 ("second prior art;" cf. patent document 2).

In methods utilizing dynamic pressure to mitigate sliding resistance, as in the case of the first prior art, dynamic pressure is not generated until the shaft reaches a certain degree of rotational speed. For this reason, sufficient quantities of sealed fluid cannot be introduced between the sealing faces during the period from when rotation begins until dynamic pressure is generated, leading to a reduction in lubrication. When there is not a sufficient amount of sealed fluid between the sealing faces, torque increases, leading to the problems of seizing, vibration, noise, and the like being generated and sliding resistance becoming unstable.

The second prior art also has the problem that, because the height of the rectilinear indentations within the plurality of grating portions is on the order of 1 μm or less, a sliding member is deformed by heat, pressure, or load when operated for extended lengths of time in environments of high heat or pressure, partially increasing the size of the gap formed with the counterpart sliding member, so that the introduction and retention of the sealed fluid between the sealing faces cannot be controlled by fine indentations of roughly 1 μm in height.

PRIOR ART DOCUMENT

Patent Documents

Patent Document 1: Japanese Unexamined Patent Application Publication No. H4-73
Patent Document 2: Domestic Re-publication of PCT International Publication No. WO 2009/087995

SUMMARY OF INVENTION

Problems to be Solved by the Invention

The present invention was contrived in order to resolve the problems in the prior art, it being an object thereof to provide sliding parts that do not leak when stopped, operate under fluid lubrication and prevent leakage when rotating, including during initial rotation, and are capable of striking a balance between seal tightness and lubrication.

Means of Solving the Problems

In order to achieve the above object, a first aspect of the sliding parts according to the present invention consists in sliding parts for allowing opposing sealing faces of an annular stationary ring fixed on a fixed side and an annular rotating ring that rotates along with a rotating shaft to rotate relative to each another, thereby sealing a sealed fluid present on one side in the radial direction of the relatively rotational sealing faces; the sliding parts being characterized in:

a plurality of pumping areas for generating pumping action via the relative rotational sliding of the stationary ring and the rotating ring being discontinuously formed in a circumferential direction on a sealing face of one of the stationary ring and rotating ring so as to communicate with a sealed fluid-containing space;

the plurality of pumping areas being provided with intake pumping areas operating in a direction in which the sealed fluid is drawn in and outflow pumping areas operating in a direction in which the sealed fluid is expelled; and a plurality of dynamic pressure-generating grooves for generating dynamic pressure via the relative rotational sliding of the stationary ring and the rotating ring being formed in a circumferential direction on a sealing face of the other of the stationary ring and the rotating ring so as to communicate with the sealed fluid-containing space.

Secondly, sliding parts according to the first aspect characterized in the pumping areas being formed on the stationary ring, and the dynamic pressure-generating grooves being formed on the rotating ring.

Thirdly, sliding parts according to the first or second aspect characterized in the pumping areas having periodic linear indentation structures, and the linear indentations being formed so that the direction of the indentations is inclined at a predetermined angle with respect to the sliding direction of the sealing faces.

Fourthly, sliding parts according to the third aspect characterized in the periodic linear indentation structures of the pumping areas being formed so that the directions of the linear indentations of adjacent pumping areas are symmetrical with respect to the sliding direction of the sealing faces.

Fifthly, sliding parts according to the third or fourth aspect characterized in the periodic linear indentation structures of the pumping areas being formed via irradiation with a femtosecond laser.

Sixthly, sliding parts according to any of the first through fifth aspects characterized in the pumping areas being provided in the bottoms of a plurality of indentations formed on the sealing face.

Seventhly, sliding parts according to any of the third through sixth aspects are characterized in depth d1 of an imaginary plane connecting the sealing face and peaks of the linear indentations of the pumping areas being set so that $d1=0-10h$, and depth d2 of the linear indentations of the pumping areas being set such that $d2=0.1h-10h$, h being the height of a liquid film formed between the sealing faces of the stationary ring and the rotating ring.

Eighthly, sliding parts according to the third through seventh aspects characterized in the linear indentations of the intake pumping areas and the outflow pumping areas being respectively inclined at arbitrary angles with respect to the circumferential direction and/or the radial direction as seen in side view.

Ninthly, sliding parts according to the eighth aspect characterized in the linear indentations of the intake pumping areas being formed so as to gradually increase in height in the rotational direction of the counterpart sliding member as seen from the side, and the linear indentations of the outflow pumping areas being formed so as to gradually decrease in height in the rotational direction of the counterpart sliding member as seen from the side.

Tenthly, sliding parts according to the eighth or ninth aspect characterized in the linear indentations of the intake pumping areas being formed so as to gradually decrease in height in the inner circumferential direction as seen from the side, and the linear indentations of the outflow pumping areas being formed so as to gradually decrease in height in the outer circumferential direction as seen from the side.

Eleventhly, sliding parts according to the first through tenth aspects characterized in the radial direction grooves making up the plurality of dynamic pressure-generating groove groups having tapered shapes tapering in opposite directions with respect to the circumferential direction so that the boundary therebetween is in a trough formed thereby, and dam parts separating the radial direction grooves being provided at the boundary therebetween, one pair of mutually adjacent radial direction grooves being taken as a single group.

Twelfthly, sliding parts according to the eleventh aspect characterized in the dynamic pressure-generating grooves extending roughly in the radial direction of the sealing face from an outer circumferential end towards an inner circumference side thereof, and bending in the inner circumferential side to form roughly L-shaped grooves extending roughly in the circumferential direction.

Effect of the Invention

The present invention yields the following superior effects.

(1) In accordance with the abovementioned first and second aspects, there is no leakage when the sliding parts are stopped, and sealed fluid is drawn into the pumping areas and a lubricant film is formed on the sealing faces during periods of low speed when rotation commences, allowing for sufficient lubrication to be obtained, sliding resistance to be reduced, and stable sliding properties to be obtained. In addition, dynamic pressure is formed on the sealing faces by the dynamic pressure-generating grooves during rotation, and a lubricant film is formed by the sealed fluid between the sealing faces of the rotating ring and the stationary ring, improving sliding properties.

In addition, by having the pumping areas be formed on the sealing face of one of the stationary ring and the rotating ring, and the dynamic pressure-generating grooves be formed on the sealing face of the other of the stationary ring and the rotating ring, freedom of design is increased, and the area of the pumping areas and the dynamic pressure-generating grooves can be expanded, allowing for a sufficient lubricant film to be formed both when rotating is starting and during rotation.

(2) In accordance with the abovementioned third aspect, the pumping areas can be formed using periodic linear indentation structures, enabling easy pumping formation, and allowing for pumping performance to be modified by modifying the angle of inclination.

(3) The abovementioned fourth aspect is favorable when the sealing faces rotate in two directions.

(4) In the abovementioned fifth aspect, the periodic linear indentation structure of the pumping areas is formed via irradiation with a femtosecond laser, allowing for both directionality and machining position to be controlled, and enabling a desired periodic linear indentation structure to be formed within each of discontinuous small divisions.

(5) In accordance with the abovementioned sixth aspect, the pumping areas are provided in the bottoms of indentations formed in the outer circumference of the rotating members, allowing for the rapid formation of a lubricant fluid film upon activation using sealed fluid drawn into the indentations.

(6) In accordance with the abovementioned seventh aspect, optimal pumping effects can be obtained.

(7) In accordance with the abovementioned eighth through tenth aspects, the intake pumping areas are more capable of drawing in and sending sealed fluid to the outflow pumping areas, and the outflow pumping areas are more capable of returning the received sealed fluid to the sealed fluid side, thereby improving sealing face lubrication and leakage prevention.

(8) In accordance with the abovementioned eleventh and twelfth aspects, the sealed fluid is gradually compressed, dynamic pressure working to force the rotating ring and the stationary ring apart is generated, and a lubricant film is readily formed by the sealed fluid between the sealing faces of the rotating ring and the stationary ring, allowing for improved sliding properties.

BRIEF DESCRIPTION OF DRAWINGS

FIG. 10 is an illustration of the first prior art; and

DESCRIPTION OF EMBODIMENTS

An embodiment of the sliding parts according to the present invention will be described in detail with reference to the drawings.

In the description of the present embodiment, an example in which parts constituting a mechanical seal are sliding parts is given, but the present invention should not be construed as being limited to such; various alterations, modifications, and improvements may be made according to the knowledge of a person skilled in the art within the scope of the present invention.

Figure 1:
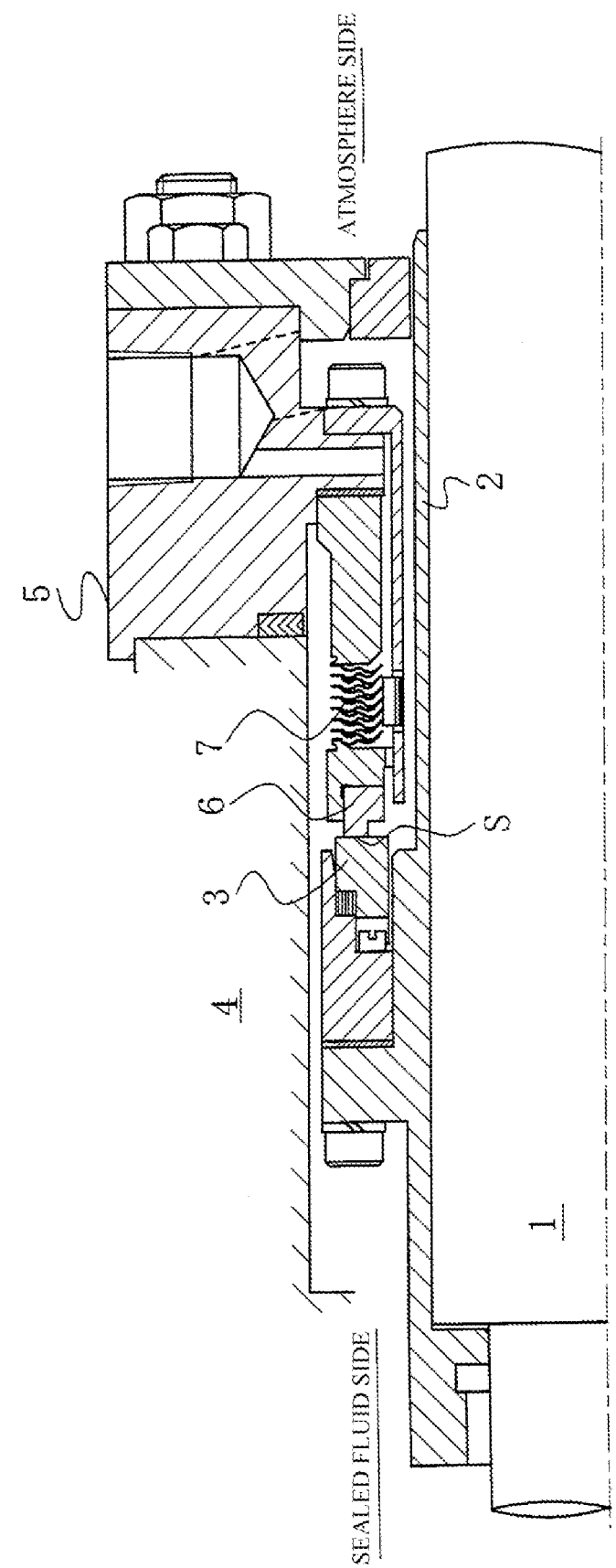
FIG. 1 is a front cross-sectional view of an example of a mechanical seal for general industrial machinery.

FIG. 1 is a front cross-sectional view of an example of a mechanical seal for general industrial machinery.

The mechanical seal shown in FIG. 1 is an inside-type seal for sealing a sealed fluid attempting to leak from the outer circumference of a sealing face in the inner circumference direction, in which an annular rotating ring 3 rotatably provided integrally with a rotating shaft 1 for driving a sealed fluid-side pump impeller (not shown), a sleeve 2 being interposed between the rotating shaft 1 and the rotating ring 3, and an annular stationary ring 6 non-rotatably but movably provided with respect to an axial direction on a seal cover 5 fixed to a pump housing 4 are configured so that sealing faces S imparted with a mirrored finish via lapping or another process slide in close contact thanks to a bellows 7 urging the stationary ring 6 in the axial direction. In other words, in this mechanical seal, the sealed fluid is prevented from escaping from the outer circumference of the rotating shaft 1 out to the atmosphere side at the sealing faces S of the rotating ring 3 and the stationary ring 6.

The rotating ring 3 and stationary ring 6 are typically both formed from SiC (a hard material), or from a combination of SiC (a hard material) and carbon (a soft material), but a sliding material used in mechanical seals can be applied as the sliding material. The SiC can be a sintered piece in which boron, aluminum, carbon, or the like is used as a sintering aid, or another material having two or more types of phases of differing components or composition, such as SiC containing dispersed graphite particles, reaction-sintered SiC of SiC and Si, SiC—TiC, SiC—TiN, and the like. The carbon can be carbon containing a mixture of carbon and graphite, or resin-molded carbon, sintered carbon, or the like. Apart from the abovementioned sliding materials, a metal material, resin material, surface-modified material (coating material), composite material, or the like can also be used.

Figure 2:
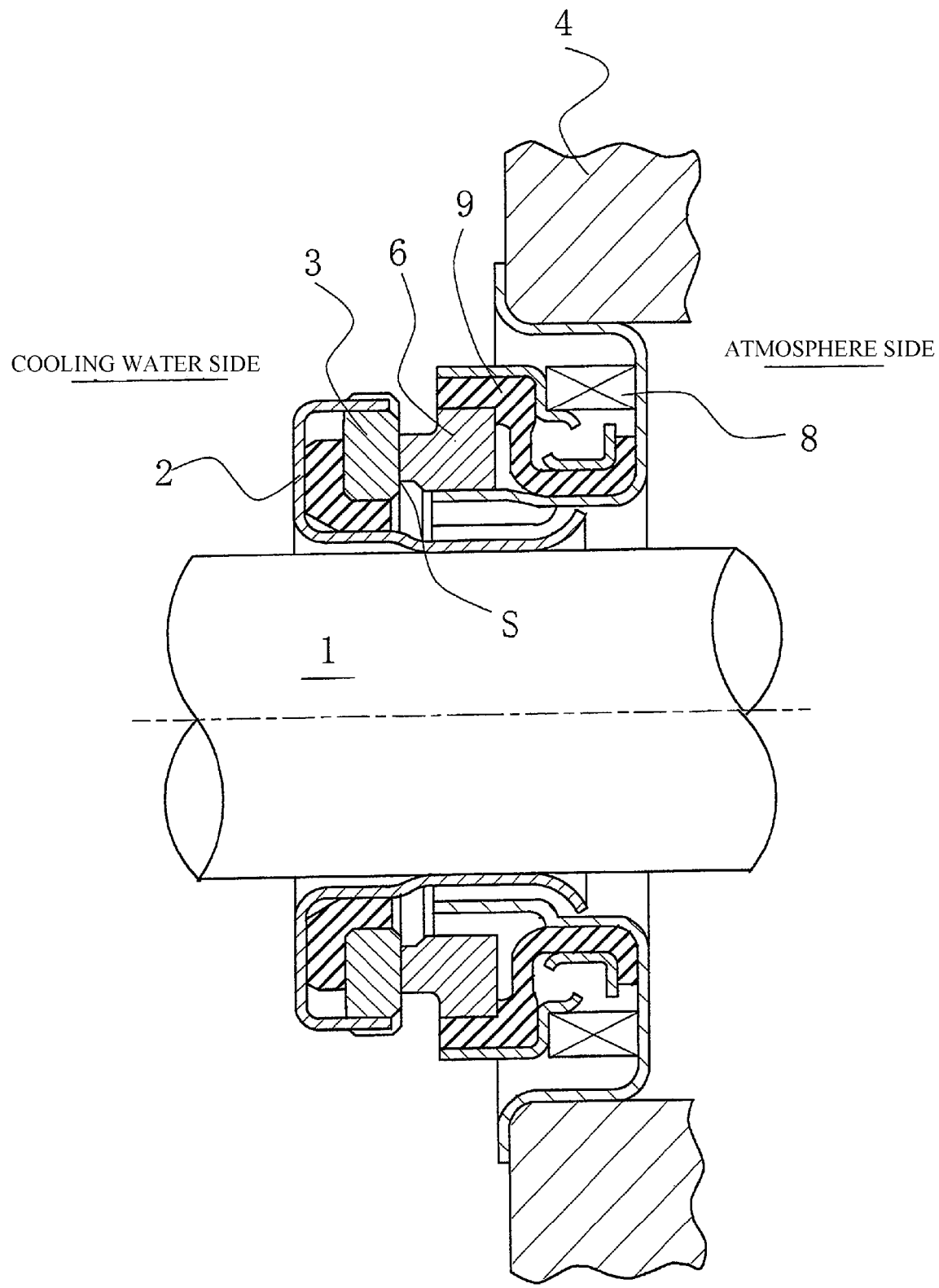
FIG. 2 is a front cross-sectional view of an example of a mechanical seal for a water pump.

FIG. 2 is a front cross-sectional view of an example of a mechanical seal for a water pump.

The mechanical seal shown in FIG. 2 is an inside-type seal for sealing cooling water attempting to leak from the outer circumference of a sealing face in the inner circumference direction, in which an annular rotating ring 3 rotatably provided integrally with a rotating shaft 1 for driving a cooling water-side pump impeller (not shown), a sleeve 2 being interposed between the rotating shaft 1 and the rotating ring 3, and an annular stationary ring 6 non-rotatably but movably provided with respect to the axial direction on a pump housing 4 are configured so that sealing faces S imparted with a mirrored finish via lapping or another process slide in close contact thanks to a coiled wave spring 8 and a bellows 9 urging the stationary ring 6 in the axial direction. In other words, in this mechanical seal, the cooling water is prevented from flowing from the outer circumference of the rotating shaft 1 out to the atmosphere side at the sealing faces S of the rotating ring 3 and the stationary ring 6.

Embodiment 1

Figure 3:
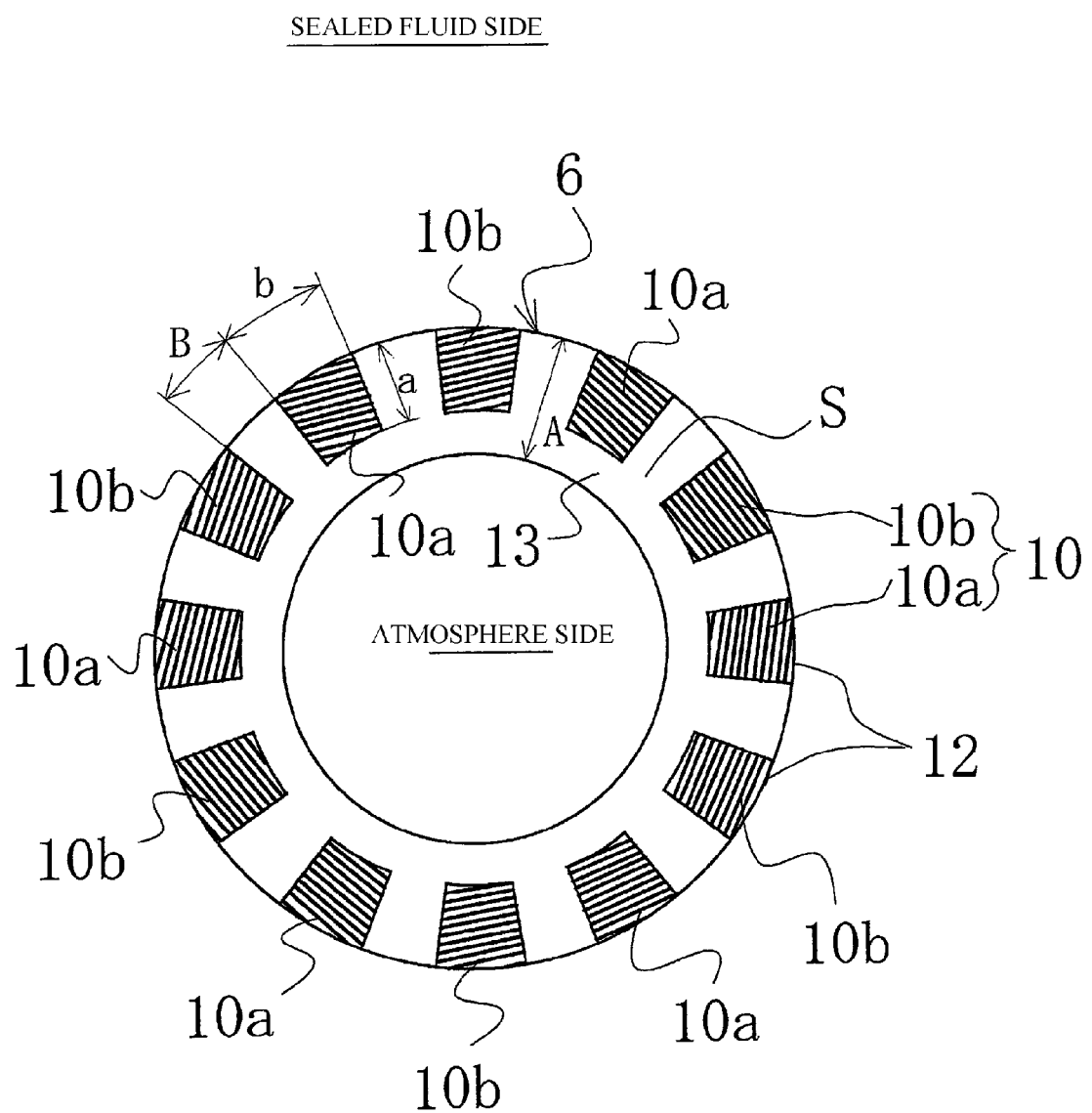
FIG. 3 is a plan view of the sealing face of a stationary ring in which pumping areas are formed according to a first embodiment of the present invention.

FIG. 3 is a plan view of one embodiment of the mechanical seal shown in FIGS. 1 and 2, in which pumping areas are formed on the sealing face S of the stationary ring 6, which has the smaller width with respect to the radial direction of the sealing faces of the stationary ring 6 and the rotating ring 3.

In FIG. 3, the stationary ring 6 is referred to as a seal ring, and is often formed from carbon (a soft material). A plurality of pumping areas 10 is discontinuously formed on the sealing face S of the stationary ring 6 in the circumferential direction so as to be a part of the radial direction of the sealing face S and directly communicate with the sealed fluid-containing space via an outer circumference side 12.

In the case of an outside-type mechanical seal in which the sealed fluid side is to the inside of the rotating ring 3 and the stationary ring 6, the pumping areas 10 need only be formed as part of the sealing face S in the radial direction and directly communicate with the sealed fluid-containing space via the inner circumference side.

The width a of the radial direction of the pumping areas 10 is roughly ⅓ to ⅔ that of the width A of the radial direction of the sealing faces S, and the angular range b of the pumping areas 10 in the circumferential direction is the same or somewhat larger than the angular range B of the sealing faces between adjacent pumping areas 10, 10.

In order to reduce friction upon the mechanical seal, a liquid film roughly 0.1 μm to 10 μm thick is necessary, depending on the type, temperature, and the like of the sealed fluid. In order to obtain such a liquid film, a plurality of independent pumping areas 10 for generating a pumping action via the relative rotational sliding of the stationary ring 6 and the rotating ring 3 is formed on the sealing face S in the circumferential direction, as described above. The pumping areas 10 are provided with intake pumping areas 10a operating in a direction in which the sealed fluid is drawn in and outflow pumping areas 10b operating in a direction in which the sealed fluid is expelled.

Figure 5:
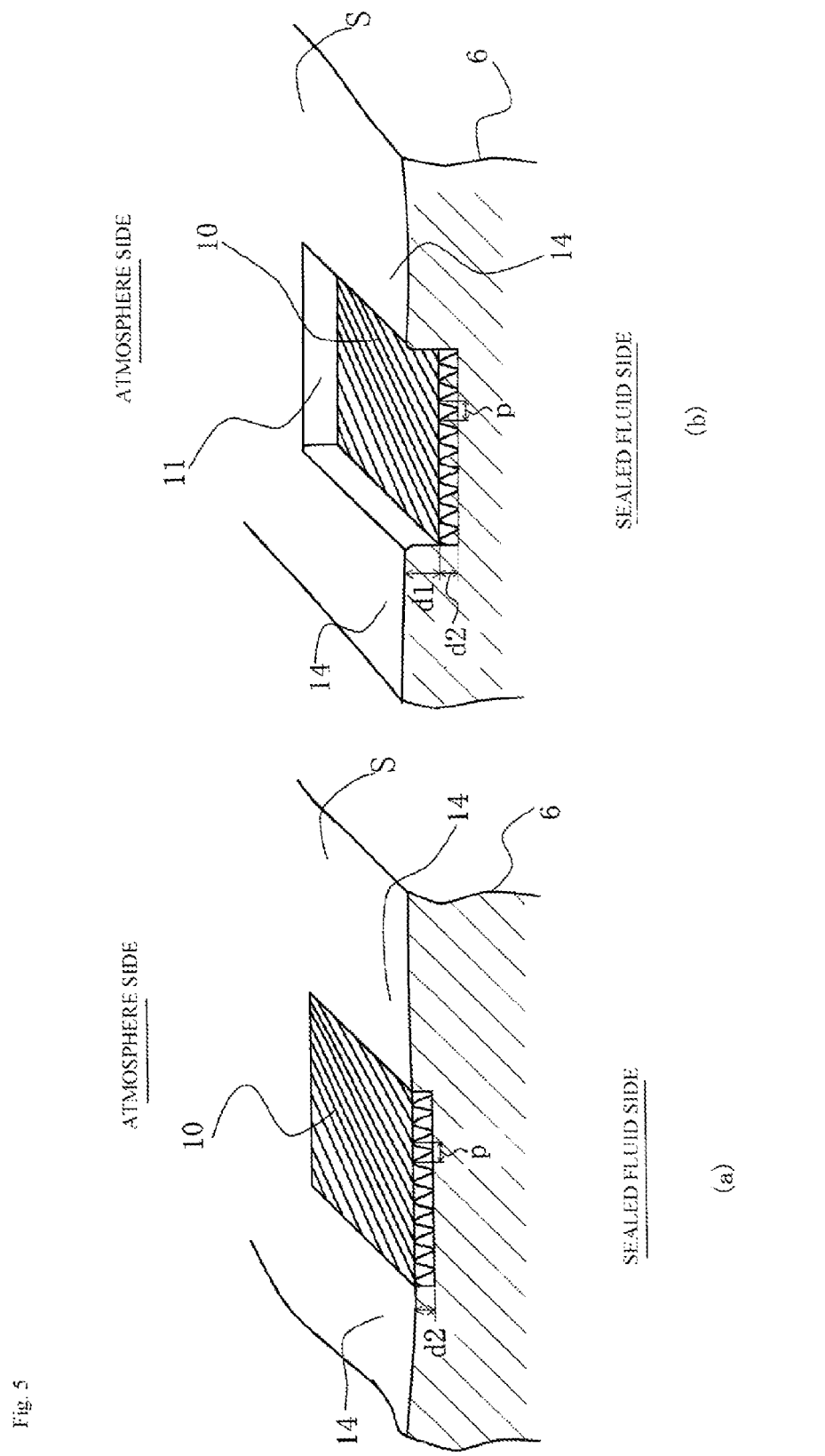
FIG. 5 is a perspective view of the pumping areas from FIGS. 3 and 4 from the sealed fluid side.

As shown in detail in FIG. 5, described hereafter, a plurality of parallel linear indentations (also referred to as a "periodic linear indentation structure" in the present invention) is formed at a constant pitch in each of the pumping areas 10, the periodic linear indentation structure being a fine structure formed using, for example, a femtosecond laser.

In the present invention, the "linear indentations" encompass not only rectilinear indentations, but also somewhat curved indentations appearing during the process of forming rectilinear indentations, as well as curvilinear indentations.

The sealed fluid side of the sealing face in which the pumping areas 10 is formed and the opposing inner circumference side must function as a seal dam for preventing leakage when stopped. Because a seal dam area 13 for yielding this seal dam function is not fully covered by the sealed fluid (lubricating fluid), it is liable to be poorly lubricated and exhibit wear. In order to prevent wear of the seal dam area 13 and reduce sliding friction, the seal dam area 13 is preferably formed from a sliding material of superior lubricity.

Figure 4:
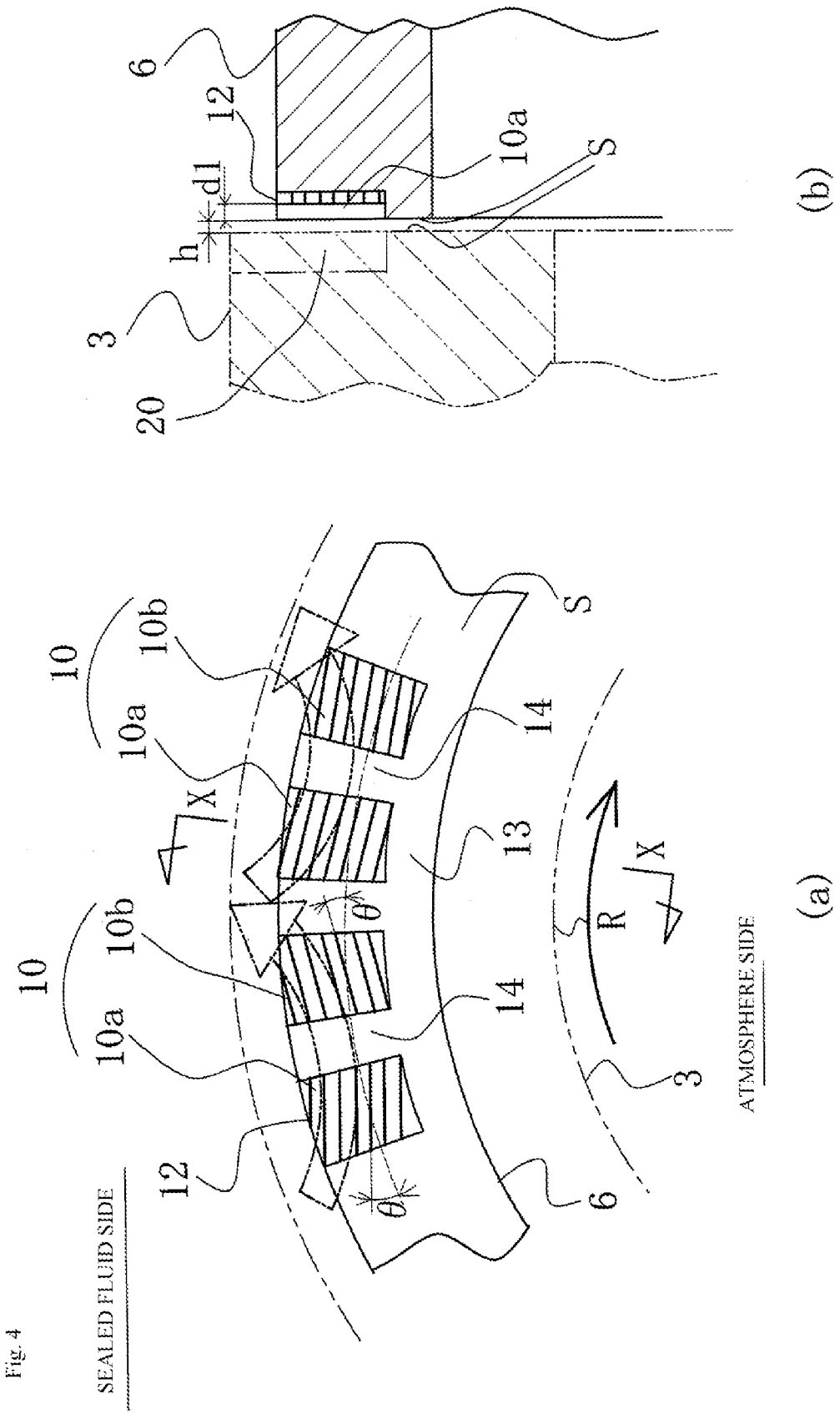
FIG. 4 is an illustration of the pumping areas of FIG. 3 in operation, with 4(a) being a magnified plan view of the main parts, and 4(b) being a cross-sectional view along line X-X in 4(a)

FIG. 4 is an illustration of the pumping areas of FIG. 3 in operation, with 4(*a*) being a magnified plan view of the main parts, and 4(*b*) being a cross-sectional view along line X-X in 4(*a*).

In FIG. 4, the stationary ring 6 is represented by a solid line, and the rotating ring 3 acting as the counterpart sliding member by a double-dashed line, the rotating ring 3 rotating in direction R.

As shown in FIG. 4(*a*), the plurality of pumping areas 10 is separated from adjacent pumping areas 10, 10 in the circumferential direction by land portions 14 of the sealing face S, and is also cut off from the atmosphere by the seal dam area 13 of the sealing face S. As shown in FIG. 4(*b*), the pumping areas 10 are formed in a part of the sealing face S in the radial direction thereof, and may be flush with the sealing face S, or formed at the bottom of a stepped part lower than the sealing face S by a level difference d1 (this level difference d1 will be discussed in detail below). The pumping areas 10 directly communicate with the sealed fluid-containing space via the outer circumference side 12. Because the sealing faces of the stationary ring 6 and the rotating ring 3 are thus in solid contact when stopped, seal integrity is maintained by the continuous sealing face in the circumferential direction, and, upon activation, the sealed fluid is drawn into the pumping areas 10, as shown by the double-dashed arrows in FIG. 4(*a*).

In addition, as shown in FIG. 4(*a*), the linear indentations formed in the pumping areas 10 incline at a predetermined angle $\theta$ with respect to the sliding direction of the sealing faces S; i.e., with the direction of the tangent line of the rotation of the sealing faces S. The predetermined angle $\theta$ is preferably from 10° to 80° with respect to the tangent line of the rotation of the sealing face S in both the inner circumference direction and the outer circumference direction of the sealing face S.

The angle of inclination $\theta$ with respect to the tangent line of rotation of the linear indentations of the pumping areas 10 in rotation of the plurality of pumping areas 10 may be the same for all pumping areas 10, or may differ for each of the pumping areas 10. However, because the sliding properties of the sealing faces S are affected by the angle of inclination $\theta$, imparting the indentations of all of the pumping areas 10 with an appropriate specific angle of inclination $\theta$ according to the desired lubricity and sliding conditions is effective in order to obtain stable sliding properties.

Thus, if the sealing faces S rotatingly slide in a single direction, the angle of inclination $\theta$ of the linear indentations of the plurality of pumping areas 10 with respect to the tangent line of rotation will be defined as a specific optimal angle.

When the sealing faces S rotatingly slide in both the forward and the reverse directions, the presence of both first pumping areas having linear indentations inclining at a first angle with respect to the tangent line of rotation yielding suitable sliding properties during rotation in one direction and second pumping areas having linear indentations inclining at a second angle with respect to the tangent line of rotation yielding suitable sliding properties during rotation in the opposite direction is preferable. Such a configuration allows suitable sliding properties to be obtained when the sealing faces S rotate in the forward and reverse directions.

More specifically, if the sealing faces S rotate in both the forward and reverse directions, the angle of inclination $\theta$ of the linear indentations of the intake pumping areas 10a and outflow pumping areas 10b are preferably formed so as to be symmetrical with respect to the tangent line of rotation.

The intake pumping areas 10a and outflow pumping areas 10b are preferably formed so as to be alternatingly disposed along the circumferential direction of the sealing faces S.

The sealing faces S shown in FIGS. 3 and 4 have a preferable configuration for cases in which the sealing faces S rotate in both directions.

The intake pumping areas 10a and outflow pumping areas 10b need not be alternatingly disposed along the sealing faces S in the circumferential direction, but rather, for example, two intake pumping areas 10a may be disposed for every outflow pumping area 10b; or the reverse ratio is also acceptable.

The pumping areas 10, which are structures (periodic structures of linear indentations) in which a plurality of parallel linear indentations are disposed with high precision at a predetermined pitch, are strictly divided, for example, by using a femtosecond laser within a predetermined area of the sealing face S, then precisely controlling the laser and forming in the direction of the linear indentations in each division.

When a substrate is irradiated using a linearly polarized laser at an irradiation intensity near a machining threshold value, the interference of the incident light and scattered light or plasma waves along the surface of the substrate will lead to an periodic structure of linear indentations having a wavelength-order pitch and groove depth self-forming orthogonally to the polarization direction. Here, the femtosecond laser may be overlappingly operated, thereby allowing a periodic linear indentation structure pattern to be formed on the surface.

In a periodic linear indentation structure formed using a femtosecond laser in this way, the directionality thereof can be controlled, as well as the machining position, allowing a desired periodic linear indentation structure to be formed within each of disparate small divisions. Specifically, if the sealing face of an annular mechanical seal sliding member is rotating while this method is used, a fine periodic pattern can be selectively formed on the sealing face. In addition, using a machining method involving a femtosecond laser allows for the formation of linear indentations of sub-micron order depth, which are effective in improving the lubricity and reducing the leakage of the mechanical seal.

The pumping areas 10 are not limited to being formed using a femtosecond laser; a picosecond laser or electron beam may also be used. The pumping areas 10 may also be formed by performing stamping or imprinting using a die provided with a periodic linear indentation structure while the sealing face of the annular mechanical seal sliding member is being rotated.

In addition, if the pumping areas are formed at a level lower than the sealing face, it is possible to form the indentations via etching, then form the periodic linear indentation structures in the bottom of the indentations using a femtosecond laser or the like. The pumping areas 10 may also be formed by forming only a periodic linear indentation structure on the sealing face using a femtosecond laser or the like, then plating or forming a film on the sealing face where the periodic linear indentation structure is not formed.

Meanwhile, the seal dam area 13 constitutes a part of the sealing face S and is flush with the sealing faces S, and the inner circumference side sealing face S becomes the seal dam area 13 thanks to the divisions in which the plurality of sealed fluid container blocks 10 is formed. The seal dam area 13 is preferably formed from a material of superior lubricity.

FIG. 5 is a perspective view of the pumping areas from FIGS. 3 and 4 from the sealed fluid side.

In order to reduce the friction of the fixed member, the rotating member, and the sealing faces, a liquid film h (see FIG. 4(b)) having a thickness of 0.1-10 μm is formed between the sealing faces depending on the type and temperature of the sealed fluid. In such cases, the depth of an imaginary plane connecting the apexes of the indentations in the pumping areas 10 is such that d1=0–10h, with the plane either being flush with the sealing face S or set lower than the sealing face S. FIG. 5(a) shows an instance in which d1=0, i.e., the imaginary plane is flush with the sealing face S, and FIG. 5(b) shows an instance in which pumping areas 10 are formed at a position lower than the sealing face S by a distance d1 within an indentation 11 formed in the sealing face S. When the imaginary plane is set lower than the sealing face S, the sealed fluid is drawn into the space within the indentation 11, and a liquid flow such that the sealed fluid does not leak to the atmosphere side is generated by the pumping areas 10.

When the pumping areas 10 are formed at the bottom of indentations 11 formed in the sealing face S, the indentations 11 are first formed using a femtosecond laser, followed by the pumping areas 10.

The depth d2 between the apexes and troughs of the indentations is preferably in the range d2=0.1h to 10h.

The pitch p of the linear indentations of the pumping areas 10 is set according to the viscosity of the sealed fluid, but is preferably from 0.1 μm to 100 μm. When the sealed fluid has a high viscosity, the pitch p should be increased so that sufficient fluid can enter the grooves.

As described above, the sealing face S being continuously formed in the circumferential direction prevents leakage when the sliding parts are stopped, and sealed fluid being drawn into the pumping areas 10 upon activation allows for the rapid formation of a lubricant fluid film, enabling the sliding torque of the sealing face S to be lowered and friction to be reduced. Furthermore, during operation, sealed fluid is drawn into the intake pumping areas 10a, sent over the land portions 14 of the sealing face S to the separately located outflow pumping areas 10b, and returned to the sealed fluid side through the action of the outflow pumping areas 10b. This sealed fluid flow allows the lubrication of the sealing faces S to be ensured, leakage to be prevented, and seal integrity to be preserved. In particular, when an imaginary plane connecting the apexes of the indentations within the pumping areas 10 is set lower than the sealing face S, the imaginary plane has a level difference d1 with the sealing face S, allowing a lubricant fluid film to be rapidly formed using the sealed fluid drawn into the indentations 11.

Figure 6:
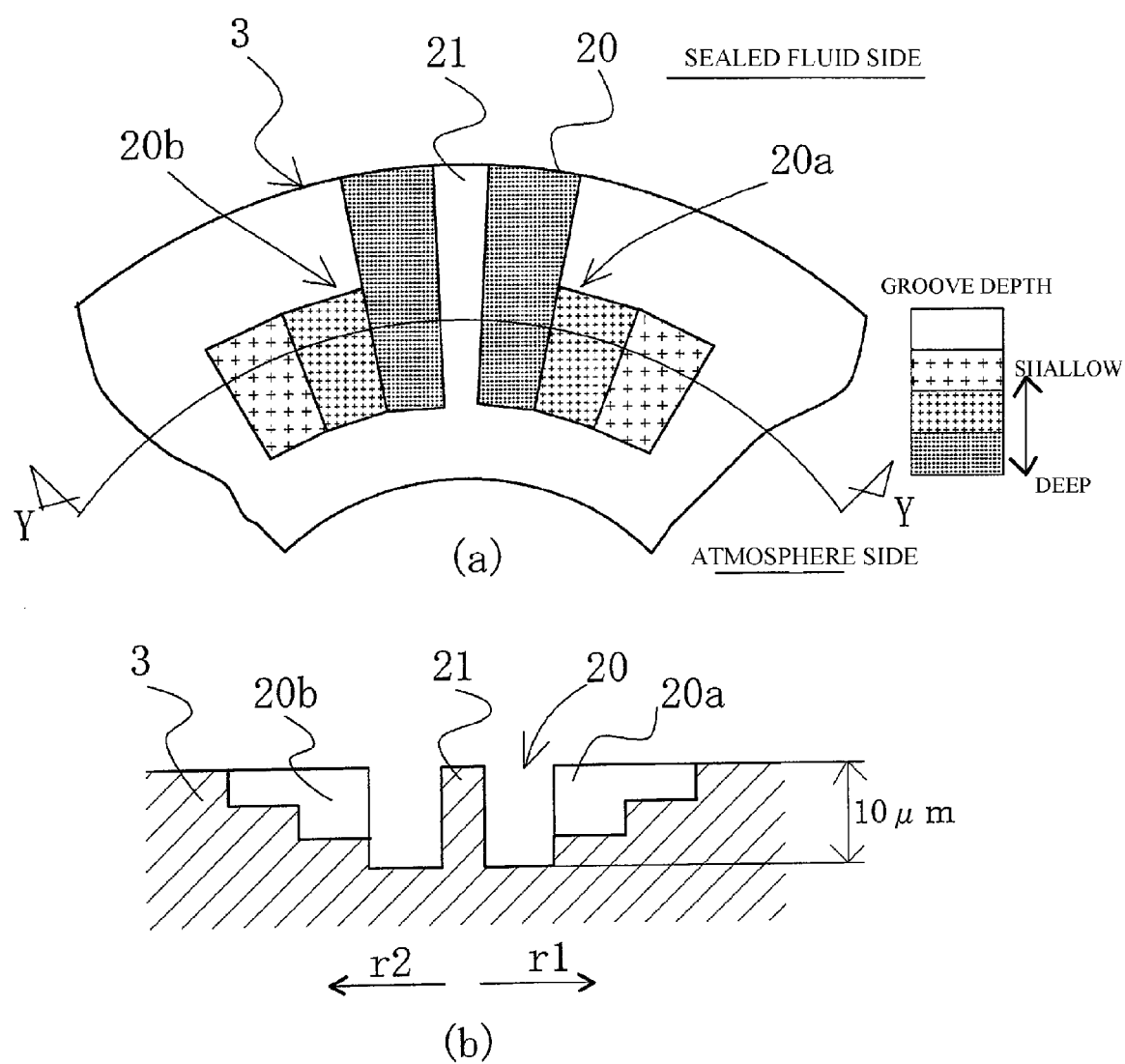
FIG. 6 is an illustration of a dynamic pressure-generating groove formed in the sealing face of a rotating ring according to the first embodiment of the present invention.

FIG. 6 is an illustration of a dynamic pressure-generating groove formed in the sealing face S of the rotating ring 3, which, of the sealing faces of the stationary ring 6 and the rotating ring 3, has the greater width in the radial direction, according to the first embodiment of the present invention, with FIG. 6(a) being a plan view thereof and FIG. 6(b) a cross-sectional view along line Y-Y in FIG. 6(a).

The dynamic pressure-generating grooves 20 are formed so that, taking one pair of adjacent radial direction grooves 20a, 20b as a single group, the radial direction grooves making up the plurality of dynamic pressure-generating groove groups have tapered shapes tapering in opposite directions with respect to the circumferential direction so that the boundaries therebetween are in troughs formed thereby, and dam parts 21 separating the radial direction grooves are provided at the boundaries therebetween.

The dynamic pressure-generating grooves 20 shown in FIG. 6(a) extend roughly in the radial direction of the sealing face S of the rotating ring 3 from an outer circumferential end towards the inner circumference thereof, and bend in the inner circumferential side to form roughly L-shaped grooves extending roughly in the circumferential direction. The dynamic pressure-generating grooves 20 communicate with the sealed fluid side at the outer circumference of the rotating ring 3, and are configured so as to readily draw the sealed fluid into the grooves.

As shown in FIG. 6(b), the depth of the dynamic pressure-generating grooves 20 gradually varies along the sliding direction in the parts thereof extending in the circumferential direction. Specifically, the depth of the dynamic pressure-generating grooves 20 decreases in steps in the direction indicated by arrow r1 in the radial direction groove 20a, and decreases in steps in the direction indicated by arrow r2 in the radial direction groove 20b.

The dynamic pressure-generating grooves 20 are not limited having the depth thereof vary in steps as shown in FIG. 6(b), but may also have surfaces inclining uniformly from the troughs thereof toward the sealing face S, so that groove depth varies in a straight line. Alternatively, a plurality of surfaces inclined at different angles may be combined, or the floors of the grooves may be curved surfaces, so that the depth thereof varies in a curved line.

Following the path taken by the sealed fluid as it is drawn from the sealed fluid into the grooves, the spaces between the dynamic pressure-generating grooves 20 and the opposed sealing face of the stationary ring 6 first grow narrower proceeding inward with respect to the radial direction, then, while widening again in the parts bent in the circumferential direction, grow shallower proceeding in the circumferential, so that the sealed fluid is ultimately compressed. The gradual compression of the sealed fluid generates dynamic pressure that works to force the rotating ring 3 and the stationary ring 6 apart. A lubricant film is thus more readily formed by the sealed fluid between the rotating ring 3 and the sealing face S of the stationary ring 6, improving sliding properties.

The dynamic pressure-generating grooves 20 can be formed in the sealing face S, which is machined to a mirror finish, via fine machining using a YVO$_4$ laser or sandblasting. The grooves may also be formed by cutting, depending on the size of the product. In the rotating ring according to the present embodiment, the dynamic pressure-generating grooves are formed to a maximum depth of 1-100 μm.

Figure 7:
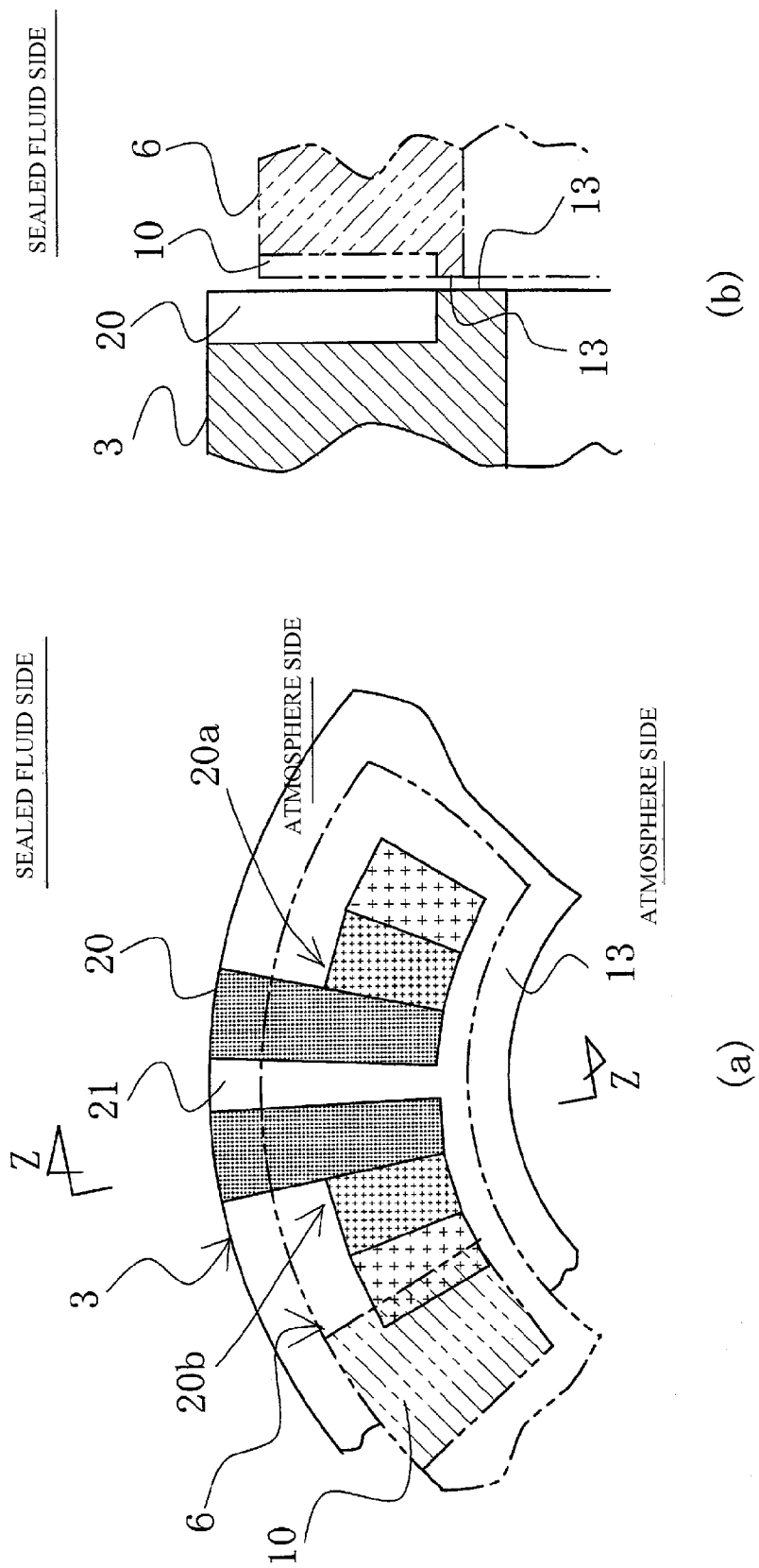
FIG. 7 is an illustration of a stationary ring in which pumping areas are formed overlapping a rotating ring in which dynamic pressure-generating grooves are formed according to the first embodiment of the present invention.

FIG. 7 is an illustration of a state in which the stationary ring 6, in which the pumping areas 10 are formed, overlaps the rotating ring 3, in which the dynamic pressure-generating grooves 20 are formed, according to the first embodiment of the present invention, with FIG. 7(*a*) being a plan view thereof and FIG. 7(*b*) being a cross-sectional view along line Z-Z in FIG. 7(*a*).

In FIG. 7, the rotating ring 3 is represented by a solid line and the stationary ring 6 by a double-dotted dashed line. The pumping areas 10 formed in the sealing face S of the stationary ring 6 and the dynamic pressure-generating grooves 20 formed in the rotating ring 3 roughly overlap at positions in the radial direction, and the inner circumference portions of the pumping areas 10 and the dynamic pressure-generating grooves 20 are also roughly aligned. In addition, a seal dam area 13 located on the inner circumference side of the dynamic pressure-generating grooves 20 of the rotating ring 3 and a seal dam area 13 located on the inner circumference side of the pumping areas 10 on the stationary ring 6 roughly overlap with respect to the radial direction, preserving seal integrity when the sliding parts are stopped.

As described above, a plurality of pumping areas 10 for generating pumping action via the relative rotational sliding of the stationary ring 6 and the rotating ring 3 is discontinuously formed in the circumferential direction on the sealing face S of one of the stationary ring 6 and the rotating ring 3 so as to communicate with the sealed fluid-containing space, the plurality of pumping areas being provided with intake pumping areas operating in a direction drawing in the sealed fluid and outflow pumping areas operating in a direction expelling the sealed fluid; and a plurality of dynamic pressure-generating grooves 20 for generating dynamic pressure via the relative rotational sliding of the stationary ring and the rotating ring is formed in the circumferential direction on the sealing face of the other of the stationary ring 6 and the rotating ring 3 so as to communicate with the sealed fluid-containing space; so that there is no leakage when the sliding parts are stopped, and the sealed fluid is drawn into the pumping areas 10 and a lubricant film is formed on the sealing faces during periods of low speed when the sliding parts begin to rotate, thereby allowing for sufficient lubrication and enabling sliding resistance to be reduced and stable sliding properties to be obtained. In addition, dynamic pressure is formed on the sealing faces S by the dynamic pressure-generating grooves 20 during rotation, and a lubricant film is formed by the sealed fluid between the sealing faces S of the rotating ring 3 and the stationary ring 6, improving sliding properties.

In addition, by having the pumping areas 10 be formed on the sealing face of one of the stationary ring 6 and the rotating ring 3, and the dynamic pressure-generating grooves 20 be formed on the sealing face of the other of the stationary ring 6 and the rotating ring 3, freedom of design is increased, and the area of the pumping areas 10 and the dynamic pressure-generating grooves 20 can be expanded, allowing for a sufficient lubricant film to be formed both when rotation is starting and during rotation.

Embodiment 2

Figure 8:
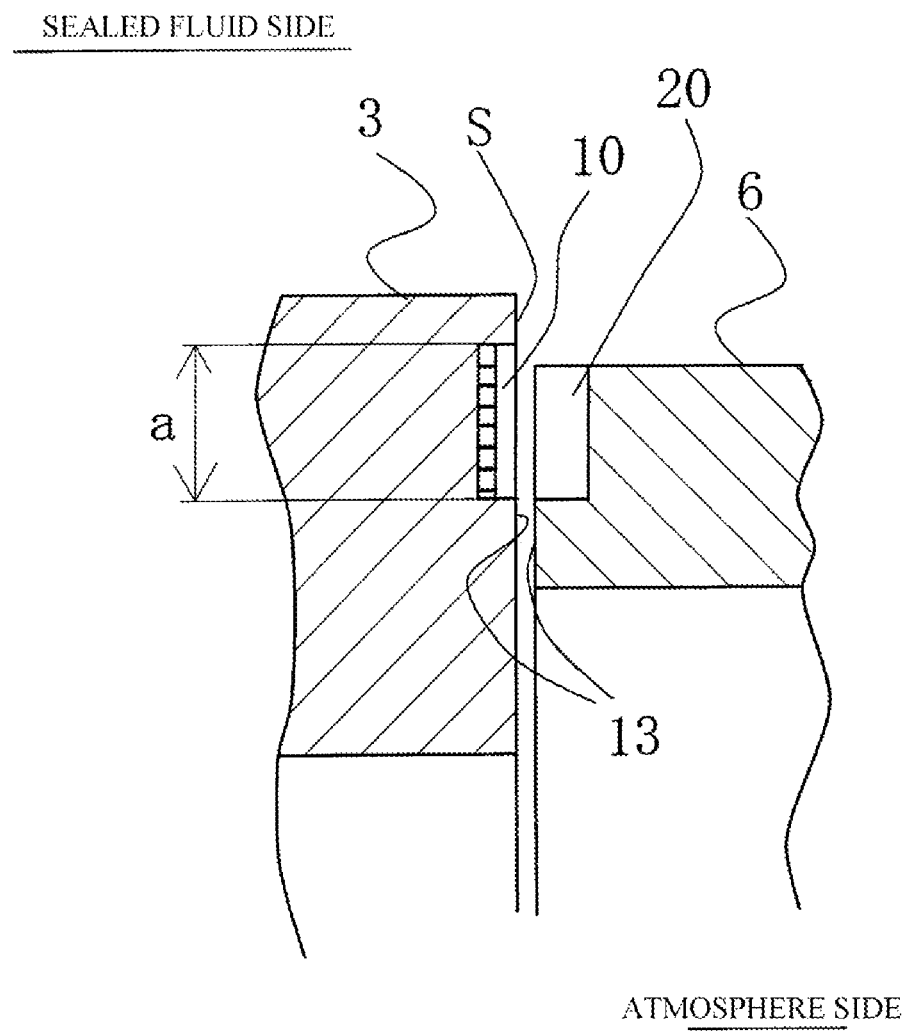
FIG. 8 is a cross-sectional view of an instance in which pumping areas are formed in a sealing face of a rotating ring and dynamic pressure-generating grooves are formed in a sealing face of a stationary ring according to a second embodiment of the present invention.

FIG. 8 is a cross-sectional view of an instance in which, contrary to the first embodiment, pumping areas 10 are formed in a sealing face of a rotating ring 3 and dynamic pressure-generating grooves 20 are formed in a sealing face of a stationary ring 6 according to a second embodiment of the present invention.

In FIG. 8, the rotating ring 3 is referred to as a mating ring, and is often formed from SiC (a hard material). A plurality of pumping areas 10 is discontinuously formed in the circumferential direction of the sealing face S of the rotating ring 3. The plurality of pumping areas 10 is formed over a part of the outer and inner parts of the radial direction of the sealing face S, and is formed so that a part of the sealed fluid in the pumping areas 10 is not covered by the corresponding sealing face S of the stationary ring 6.

The stationary ring 6 is referred to as a seal ring, and is often formed from carbon (a soft material). Dynamic pressure-generating grooves 20 are formed in the sealing face S of the stationary ring 6. The dynamic pressure-generating grooves 20 connect the outer circumference side to the sealed fluid side.

A seal dam area 13 formed, for example, from a sliding material of superior lubricity is formed further towards the inner circumference side (atmosphere side) than the area in which the pumping areas 10 on the sealing face S of the rotating ring 3 are formed, and further towards the inner circumference side (atmosphere side) than the area in which the dynamic pressure-generating grooves 20 on the sealing face S of the stationary ring 6 are formed.

Embodiment 3

Figure 9:
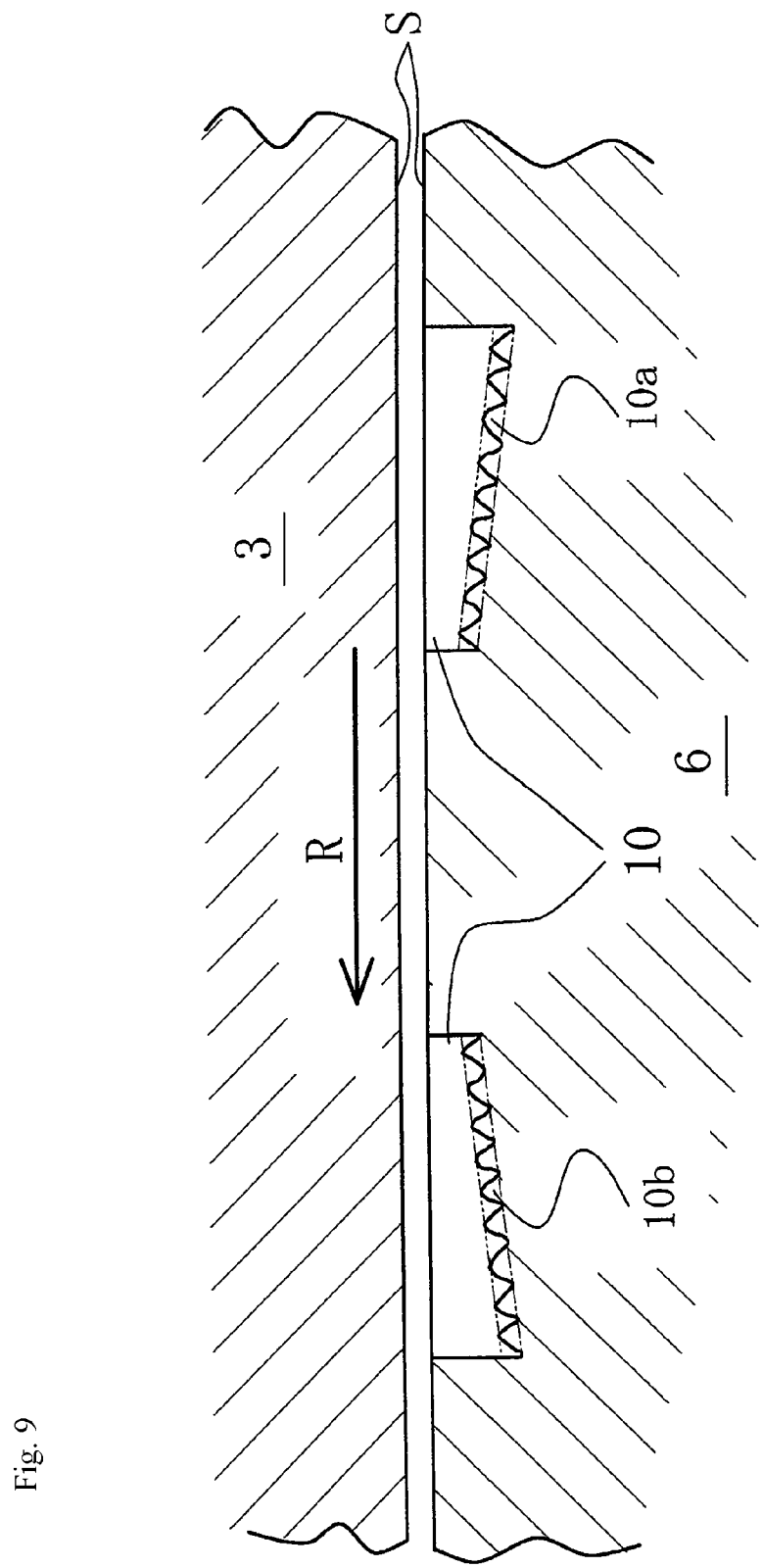
FIG. 9 is an illustration of another embodiment of pumping areas according to a third embodiment of the present invention, and is a cross-sectional view along a plane orthogonal to the sealing faces.
Figure 11:
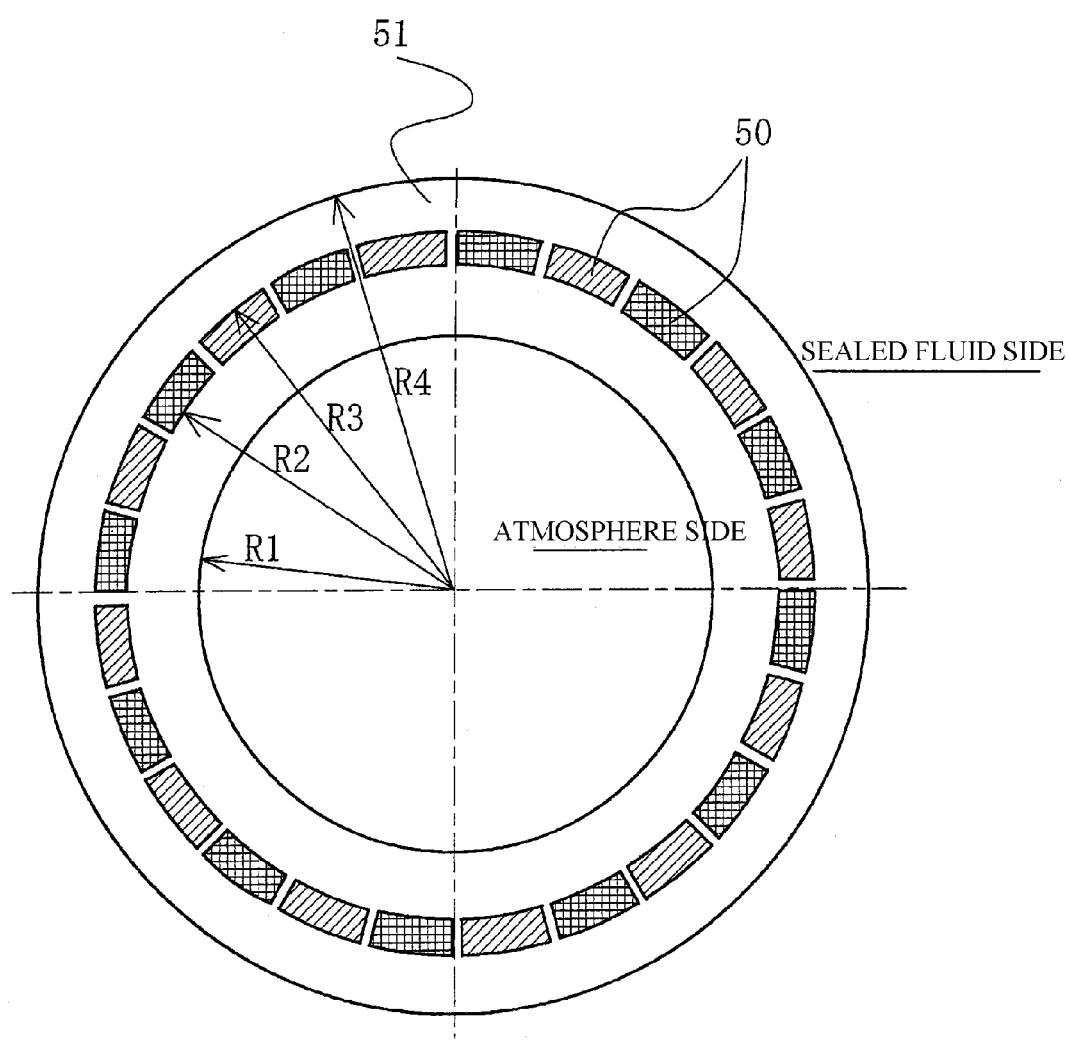
FIG. 11 is a plan view of the second prior art.

FIG. 9 is an illustration of another embodiment of pumping areas according to a third embodiment of the present invention, and is a cross-sectional view along a plane orthogonal to the sealing faces.

Whereas the pumping areas 10 are formed parallel to a plane orthogonal to the axis in the circumferential direction and the radial direction in the first embodiment, in FIG. 9, the intake pumping areas 10*a* are formed so that the linear indentations thereof grow progressively higher (shallower) towards the rotational direction R of the rotating ring 3 constituting the counterpart sliding member, and the outflow pumping areas 10*b* are formed so that the linear indentations thereof grow progressively lower (deeper) towards the rotational direction R of the rotating ring 3 constituting the counterpart sliding member.

Because the linear indentations are both inclined with respect to the rotation tangent line as seen in plan view and inclined in the circumferential direction as seen from the side, the intake pumping areas 10*a* are more capable of drawing in and sending the sealed fluid to the outflow pumping areas 10*b*, and the outflow pumping areas 10*b* are more capable of returning the received sealed fluid to the sealed fluid side. In the case of the present example, taking the thickness h of the liquid film formed between the sealing faces of the stationary ring and the rotating ring, the depth with respect to the sealing face of the deepest part and the shallowest part of an imaginary plane connecting the apexes of the indentations in the pumping areas on the sealing face need only be within the range 0-10h.

The pumping areas 10 may optionally be inclined in the circumferential direction and/or radial direction as necessary. For example, if the pumping areas 10 are formed as shown in FIG. 3, it is conceivable for the intake pumping areas 10*a* to be formed so as to gradually decrease in height towards the interior along the radial direction, allowing the sealed fluid to be drawn in more easily, and the outflow pumping areas 10*b* to be formed so as to gradually increase in height towards the interior along the radial direction, allowing the sealed fluid to be expelled more easily.

In the case of the present example as well, taking the thickness h of the liquid film formed between the sealing faces of the stationary ring and the rotating ring, the depth with respect to the sealing face of the deepest part and the shallowest part of an imaginary plane connecting the apexes of the indentations in the pumping areas on the sealing face need only be within the range 0-10h.

If the sealed fluid side is an outside-type mechanical seal present to the inside of the rotating ring 3 and the stationary ring 6, the pumping areas 10 and the dynamic pressure-generating grooves 20 are formed facing the interior. In such cases, part of the pumping areas 10 to the inside with respect to the radial direction need only be disposed so as not to be covered by the corresponding sealing face.

REFERENCE SIGNS LIST

1 Rotating shaft
2 Sleeve
3 Rotating ring
4 Housing
5 Seal cover
6 Stationary ring
7 Bellows
8 Coiled wave spring
9 Bellows
10 Pumping area
10a Intake pumping area
10b Outflow pumping area
11 Indentation
12 Outer circumference
13 Seal dam area
14 Land portion
20 Dynamic pressure-generating groove
20a, 20b Pair of radial direction grooves
21 Dam part
S Sealing face

The invention claimed is:

1. Sliding parts for allowing opposing sealing faces of an annular stationary ring fixed on a fixed side and an annular rotating ring that rotates along with a rotating shaft to rotate relative to one another, thereby sealing a sealed fluid present on one side in the radial direction of said relatively rotational sealing faces; the sliding parts being characterized in:
   a plurality of pumping areas for generating pumping action via the relative rotational sliding of said stationary ring and rotating ring being discontinuously formed in a circumferential direction in the sealing face of one of the stationary ring and rotating ring so as to communicate with a sealed fluid-containing space;
   said plurality of pumping areas being provided with intake pumping areas operating in a direction in which the sealed fluid is drawn in and outflow pumping areas operating in a direction in which the sealed fluid is expelled, said intake pumping areas and outflow pumping areas being both provided in the sealing face of said one of the stationary ring and rotating ring; and
   a plurality of dynamic pressure-generating grooves for generating dynamic pressure via the relative rotational sliding of said stationary ring and the rotating ring being formed in a circumferential direction in the sealing face of the other of the stationary ring and the rotating ring so as to communicate with the sealed fluid-containing space.

2. The sliding parts according to claim 1, characterized in said pumping areas being formed on said stationary ring, and said dynamic pressure-generating grooves being formed on said rotating ring.

3. The sliding parts according to claim 1, characterized in said pumping areas having periodic linear indentation structures, said linear indentations being formed so that the direction of the indentations is inclined at a predetermined angle with respect to the sliding direction of the sealing faces.

4. The sliding parts according to claim 3, characterized in said periodic linear indentation structures of said pumping areas being formed so that the directions of said linear indentations of adjacent pumping areas are symmetrical with respect to the sliding direction of the sealing faces.

5. The sliding parts according to claim 3, characterized in said periodic linear indentation structures of said pumping areas being formed via irradiation by a femtosecond laser.

6. The sliding parts according to claim 1, characterized in said pumping areas being provided in the bottoms of a plurality of indentations formed on the sealing face.

7. The sliding parts according to claim 3, characterized in depth d1 of an imaginary plane connecting the sealing face and peaks of the linear indentations of the pumping areas being set so that $d1=0\text{-}10h$, and depth d2 of the linear indentations of the pumping areas being set so that $d2=0.1h\text{-}10h$, h being the height of a liquid film formed between the sealing faces of said stationary ring and rotating ring.

8. The sliding parts according to claim 3, characterized in the linear indentations of said intake pumping areas and outflow pumping areas being respectively inclined at arbitrary angles with respect to the circumferential direction and/or the radial direction as seen in side view.

9. The sliding parts according to claim 8, characterized in the linear indentations of said intake pumping areas being formed so as to gradually increase in height in the rotational direction of the counterpart sliding member as seen from the side, and the linear indentations of the outflow pumping areas being formed so as to gradually decrease in height in the rotational direction of the counterpart sliding member as seen from the side.

10. The sliding parts according to claim 8, characterized in the linear indentations of said intake pumping areas being formed so as to gradually decrease in height in the inner circumferential direction as seen from the side, and the linear indentations of the outflow pumping areas being formed so as to gradually decrease in height in the outer circumferential direction as seen from the side.

11. The sliding parts according to claim 1, characterized in the radial direction grooves making up the plurality of said dynamic pressure-generating groove groups having tapered shapes tapering in opposite directions with respect to the circumferential direction so that the boundaries therebetween are in troughs formed thereby, and dam parts separating the radial direction grooves being provided at the boundaries therebetween, one pair of mutually adjacent radial direction grooves being taken as a single group.

12. The sliding parts according to claim 11, characterized in said dynamic pressure-generating grooves extending roughly in the radial direction of the sealing face from an outer circumferential end towards an inner circumference side thereof, and bending in the inner circumferential side to form roughly L-shaped grooves extending roughly in the circumferential direction.

13. The sliding parts according to claim 2, characterized in said pumping areas having periodic linear indentation structures, said linear indentations being formed so that the direction of the indentations is inclined at a predetermined angle with respect to the sliding direction of the sealing faces.

14. The sliding parts according to claim 2, characterized in said pumping areas being provided in the bottoms of a plurality of indentations formed on the sealing face.

15. The sliding parts according to claim 3, characterized in said pumping areas being provided in the bottoms of a plurality of indentations formed on the sealing face.

16. The sliding parts according to claim 2, characterized in the radial direction grooves making up the plurality of said dynamic pressure-generating groove groups having tapered shapes tapering in opposite directions with respect to the circumferential direction so that the boundaries therebetween are in troughs formed thereby, and dam parts separating the radial direction grooves being provided at the boundaries therebetween, one pair of mutually adjacent radial direction grooves being taken as a single group.

17. The sliding parts according to claim 3, characterized in the radial direction grooves making up the plurality of said dynamic pressure-generating groove groups having tapered shapes tapering in opposite directions with respect to the circumferential direction so that the boundaries therebetween are in troughs formed thereby, and dam parts separating the radial direction grooves being provided at the boundaries therebetween, one pair of mutually adjacent radial direction grooves being taken as a single group.

18. The sliding parts according to claim 1, wherein the plurality of pumping areas and the plurality of dynamic pressure-generating grooves overlap as viewed from a direction parallel to the rotating shaft.

* * * * *